United States Patent [19]
Memmel, Jr.
[11] 4,238,273
[45] Dec. 9, 1980

[54] ROD APPLICATOR MECHANISM FOR MACHINE FOR MAKING HANGING FILE FOLDERS

[75] Inventor: Robert A. Memmel, Jr., Brown Deer, Wis.

[73] Assignee: Condes Corporation, Milwaukee, Wis.

[21] Appl. No.: 21,686

[22] Filed: Mar. 19, 1979

[51] Int. Cl.[3] ........................ B23Q 7/04; B32B 31/12; B65C 9/00

[52] U.S. Cl. .................................... 156/552; 156/475; 156/546; 156/558; 156/572; 221/211; 221/212

[58] Field of Search ............... 156/464, 475, 546, 552, 156/558, 383, 572; 221/211, 212

[56] References Cited

U.S. PATENT DOCUMENTS 3,151,014 9/1964 Jackson ................................ 156/475
3,446,690 5/1969 Charles ................................ 156/446
3,700,528 10/1972 Kidd ..................................... 156/475
3,992,245 11/1976 Franklin ........................... 221/211 X

*Primary Examiner*—John T. Goolkasian
*Assistant Examiner*—Robert A. Dawson
*Attorney, Agent, or Firm*—James E. Nilles

[57] ABSTRACT

A machine for making hanging file folders, each of which folders comprises a folded paperboard blank and a pair of support rods fastened to the upper edges of the folded blanks and includes a rod applicator mechanism comprising a conveyor for moving an unfolded flat blank having glue patterns thereon along a path; a mechanism for momentarily interrupting or stopping movement of the blank along the path; a pair of rod-dispensing magazines adjacent the path; and rod transfer mechanisms for transferring rods from the magazines and applying them to the glue patterns while the blank is stopped, whereafter blank movement resumes. The conveyor includes a pair of separable rollers between which the blank passes and by which it is advanced when the rollers are closed. The mechanism for momentarily interrupting movement of the blank effects momentary separation of the rollers and includes a stop member temporarily movable into the path of movement of the blank to arrest its progress after the rollers separate. Each rod transfer mechanism comprises a reciprocably and horizontally movable grooved rod-holding plate for removing a rod from an opening at the bottom of a magazine and a reciprocably and vertically movable rod applicator for removing (lifting) the rod from the plate groove, for then lowering the rod, and for then applying the rod to a glue pattern on the blank. The rod plate groove and rod applicator each have fluid ports therein which are connectable by appropriate valving to a fluid pump and a vacuum pump, alternately for temporarily holding a rod thereon during movement thereby and to then subsequently enable release of the rod therefrom.

7 Claims, 38 Drawing Figures

TIMING CHART

ROD APPLICATOR MECHANISM FOR MACHINE FOR MAKING HANGING FILE FOLDERS

TECHNICAL FIELD

This invention relates generally to machines for making hanging file folders of a type having support rods secured near the two upper edges of a folded vertically hanging paperboard blank. In particular, it relates to rod applicator mechanisms for such machines whereby rods are transferred from a magazine and applied to glue lines on an unfolded paperboard blank.

DESCRIPTION OF THE PRIOR ART

U.S. Pat. No. 3,700,528 owned by the same assignee as the present application discloses a machine in which unfolded paperboard blanks are continuously conveyed in succession through the machine along a horizontal path, wherein particular glue patterns are applied adjacent the longitudinal edges of the blanks, and wherein vertically stacked elongated flat support rods are transferred from magazines on each side of the horizontal path and precisely deposited on the glue patterns by rod pick-up and transfer means associated with each magazine while the blanks are advancing, whereafter the longitudinal edges of the blanks are folded over the emplaced rods and firmly pressed against the glue patterns. The components necessary for performing such operations operate in timed sequence with each other. The rod pick-up and transfer means comprises a pair of slideable guides for moving the lowermost rod in the associated magazine to a position over a glue pattern on a moving blank, support means for receiving the rod from the guides, magnet means for holding the rod on the support means and for urging the rod against the glue pattern on the moving blank, and means for operating these components in timed relationship with each other.

SUMMARY OF THE INVENTION

In accordance with the present invention, there is provided a machine of the aforesaid character for making hanging file folders and having an improved rod applicator mechanism whereby the accuracy and speed of placement of the rods upon the glue patterns in improved, thereby eliminating waste, and enabling substantially higher production speeds, i.e., on the order of 175 units per minute or more, as compared to about 100 units per minute in prior art machines.

An improved rod applicator mechanism in accordance with the invention for making hanging file folders, each of which folders comprises a folded paperboard blank and a pair of support rods fastened to the upper edges of the folded blank comprises: A conveyor for moving an unfolded flat blank having glue patterns thereon along a path; a mechanism for momentarily interrupting or stopping movement of the blank along the path; a pair of roddispensing magazines adjacent the path; and rod transfer and applicator mechanisms for transferrring rods from the magazines and applying them to the glue patterns while the blank is stopped, whereafter blank movement resumes. The conveyor comprises a pair of separable rollers between which the blank passes and by which it is advanced when the rollers are closed. The mechanism for momentarily interrupting movement of the blank effects momentary separation of the rollers and includes a stop member temporarily movable into the path of movement of the blank to arrest its progress after the rollers separate. Each rod transfer and applicator mechanism comprises a reciprocably and horizontally movable finger plate having a rod-holding groove therein for removing a rod from an opening at the bottom of a magazine and a reciprocably and vertically movable rod applicator bar for removing (lifting) the rod from the finger plate groove, for then lowering the rod, and for then applying the rod to a glue pattern on the blank. The finger plate groove and rod applicator bar each have fluid suction ports therein which are connectable by appropriate valving to a fluid pump and a vacuum pump, alternately for temporarily holding a rod thereon during movement thereby to then subsequently enable release of the rod therefrom.

More specifically, the rods, which are flat elongated members and are horizontally disposed and vertically stacked in each magazine, are gravity fed from a rod-dispensing opening in the bottom of the magazine. The finger plate is reciprocably movable in a horizontal path below the magazine opening whereby the bottommost rod in the stack falls into the finger plate groove and is shifted laterally away from the magazine. The finger plate groove has fluid ports therein which can be vacuumized to hold the rod securely therein during lateral shifting and which can then be momentarily pressured to enable its removal from the groove by the applicator bar. The applicator bar is reciprocably movable in a vertical path and intersects the horizontal path of movement of the finger plate. The applicator bar has fluid ports on its bottom side which can be vacuumized and subsequently pressurized. In operation, the applicator bar contacts the rod in the finger plate groove, lifts it therefrom (while the fluid ports in the fringer plate groove are pressurized and while the fluid ports in the applicator bar are vacuumized), raises the rod, lowers it after the finger plate retracts, and then deposits the rod on a glud pattern on the blank. When the applicator bar descends, the fluid ports thereon are pressurized to positively force the rod onto the glue pattern.

Means are provided to synchronize, coordinate and time the operations of the conveyor, the mechanism for interrupting blank movement, and the rod transfer and applicator mechanism.

A rod applicator mechanism in accordance with the invention is completely automatic in operation and enables more acurate and higher speed positioning and depositing of rods than prior art mechanisms.

These and other objects and advantages of the present invention will appear hereinafter as this disclosure progresses, reference being had to the accompanying drawings.

DESCRIPTION OF A PREFERRED EMBODIMENT

Figure 2:
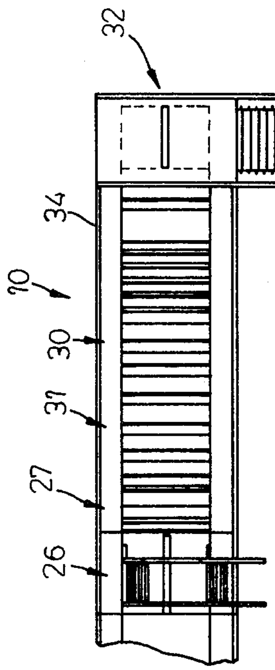
FIG. 2 is a top plan view of the discharge end of the machine taken on line 2—2 of FIG. 1.
Figure 1:
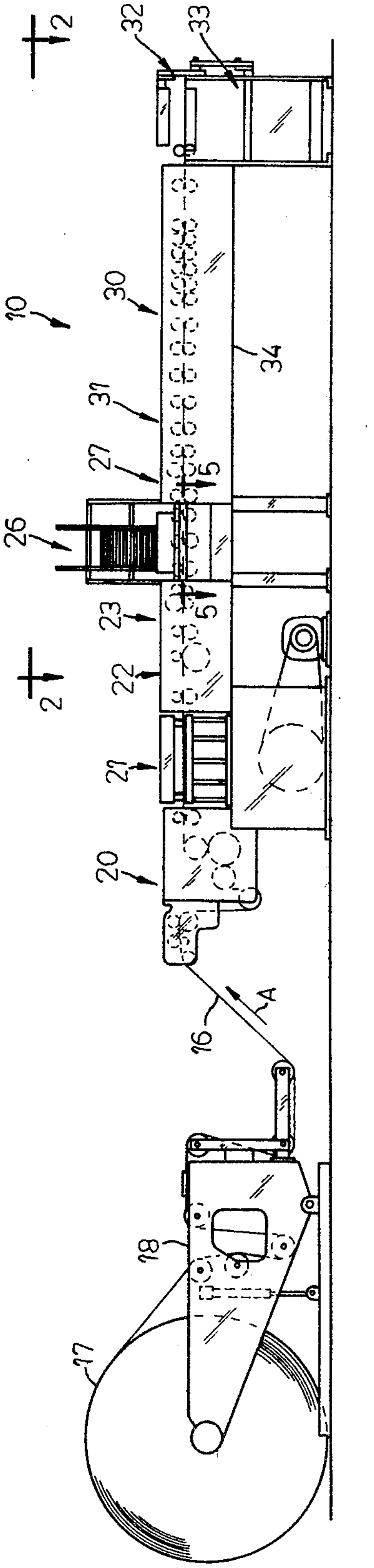
FIG. 1 is a side elevational view of a machine for making hanging file folders and having a rod transfer mechanism in accordance with the invention.
Figure 3:
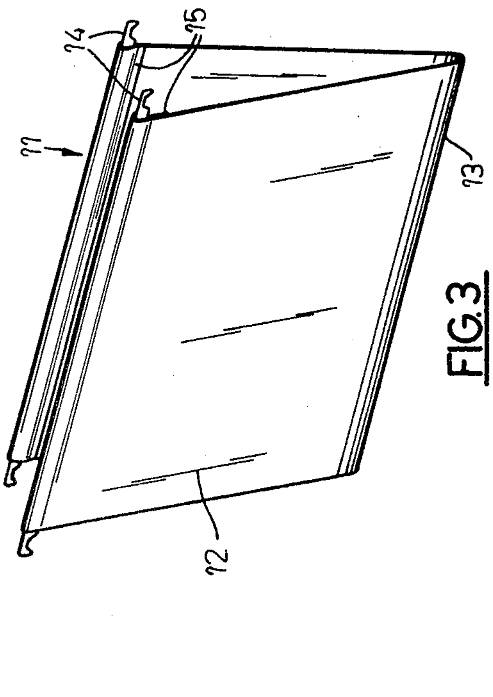
FIG. 3 is an enlarged perspective view of a finished hanging file folder of a type manufactured by the machine of FIG. 1 and showing it to comprise a folded paperboard blank and a pair of support rods.

FIGS. 1 and 2 show a machine 10 in accordance with the invention for making a hanging file folder 11 of the type shown in FIG. 3. Folder 11 comprises a paperboard blank 12, folded along a bottom fold line 13, and having a pair of flat elongated notched metal or plastic support rods 14 glued within overfolded upper edge portions 15 of the blank. Machine 10 receives and operates upon a continuous web 16 of paperboard which is supplied from a roll 17 which is supported on a web supply mechanism 18.

Figure 12:
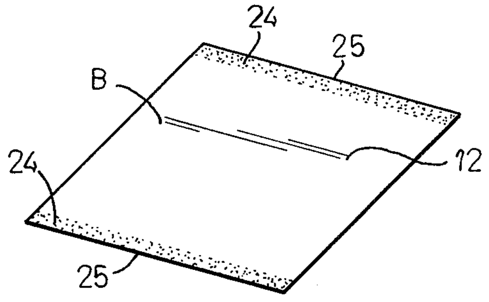
FIGS. 12, 14 and 16 are perspective views of the blank shown in FIGS. 11, 13, and 15, respectively, showing various stages of processing thereof.

Generally considered, machine 10 includes the following mechanisms which perform the following operations on incoming web 16. A web feed mechanism 20 at the input end of machine 10 continuously feeds web 16 thereinto in the direction of arrow A. A blank cutting mechanism 21 successively cuts individual unfolded blanks 12 from the incoming web 16. A first or infeed conveyor mechanism 22 moves the blanks 12 into a first glue applicator mechanism 23 wherein first glue lines or glue patterns 24 are applied to each blank adjacent the opposite longitudinal edges 25 of a blank (see FIG. 12), which edges when folded correspond to the upper edge portions 15 (see FIG. 2) of the finished folder 11.

Figure 14:
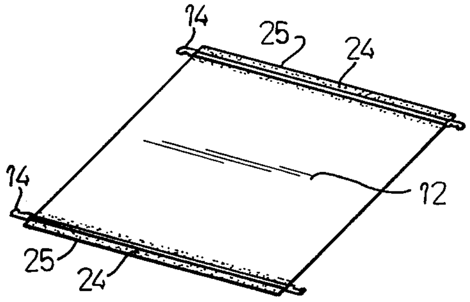

A rod applicator mechanism 26 in accordance with the invention receives and conveys the blanks 12 with the first glue lines 24 thereon, momentarily stops each blank, removes a rod 14 from each magazine 41 and applies to on each first glue line 24 (see FIG. 14), and then transports the blanks 12 with the rods 14 thereon to a second glue applicator mechanism 27 for further processing and finishing.

Figure 16:
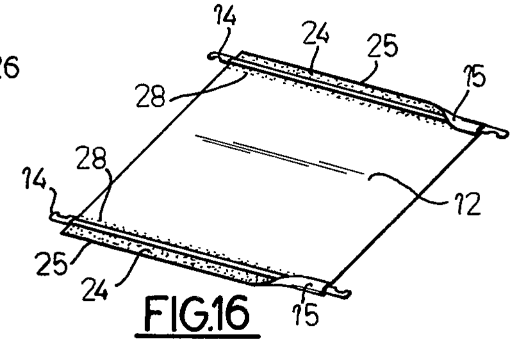
Figure 17:
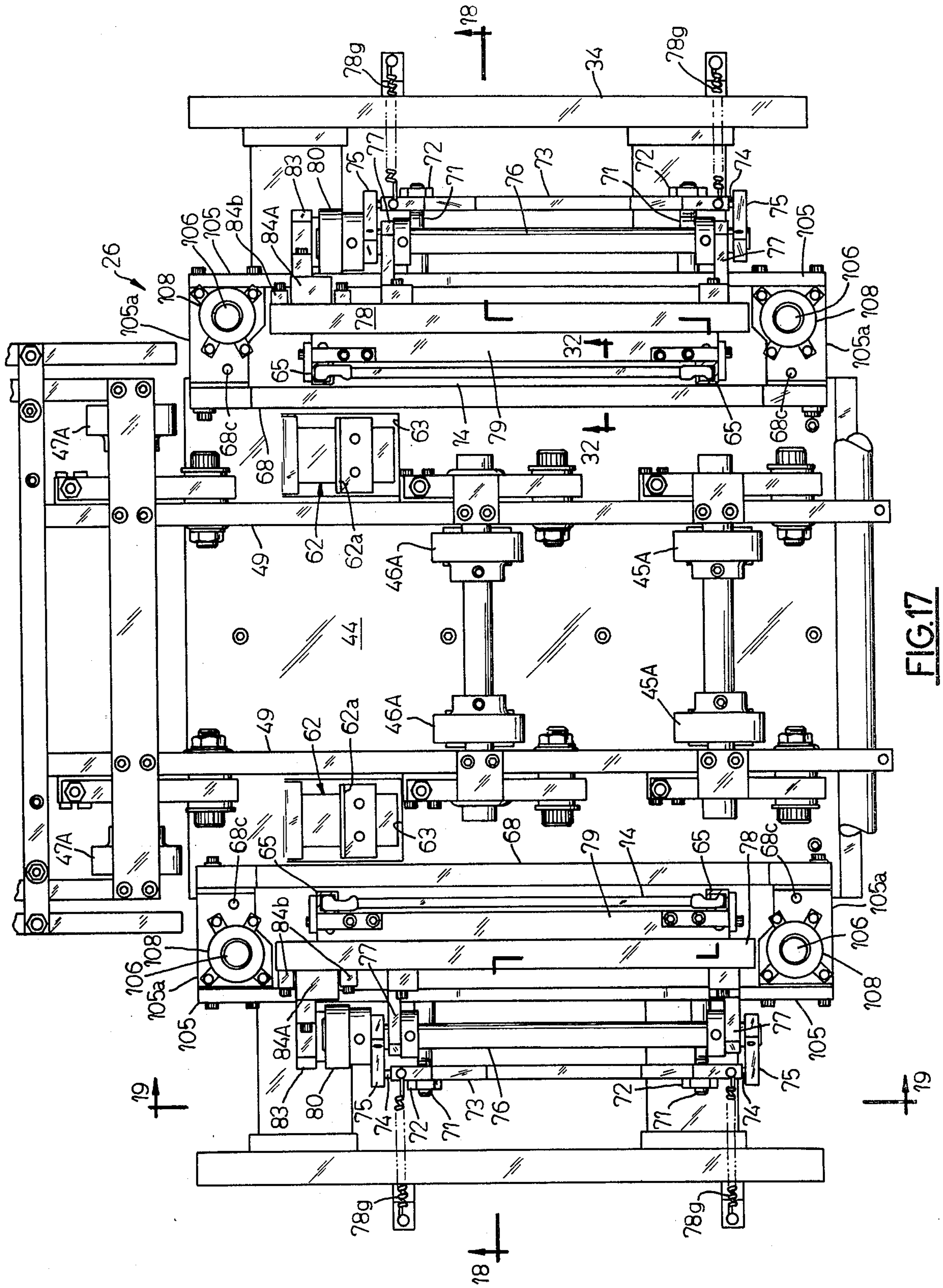
FIG. 17 is an enlarged top plan view of the blank conveyor mechanism shown in FIG. 5 and also showing the rod-holding magazines and the rod transfer mechanisms associated therewith.

In mechanism 27, second glue lines or glue patterns 28 are applied to each blank adjacent, parallel and inboard of the first glue lines 24 on the rods 14 thereon. Another conveyor mechanism 30 moves the blanks 12 with the second glue lines 28 thereon to an edge-folding mechanism 31 which edge folds the blanks 12 (see FIGS. 3 and 16) to encapsulate the rods 14 and presses the folded edges 25 into contact with the second glue lines 28. Conveyor mechanism 30 then moves the blanks 12, with edges folded, glued, and rods 14 secured, to a blank folding mechanism 32 wherein the bottom foldline 13 (FIG. 3) is provided, and from thence to a file folder stacking mechanism 33 from whence the finished folders 11 are removed from machine 10 by suitable means (not shown). Machine 10 includes a suitable supporting framework or structure 34 on which all mechanisms are mounted, and such structure may be incorporated in some mechanisms. All component mechanisms of machine 10, except the rod applicator mechanism 26 hereinafter described in detail, may take the form of mechanisms known in the prior art.

As FIGS. 4 through 13, 17 through 21, and 31 through 37 show, rod applicator mechanism 26 in accordance with the invention generaly comprises: blank conveyor means 40 for moving a blank 12 therethrough; a mechanism for momentarily interrupting or stopping movement of the blank; a pair of rod holding and dispensing magazines 41 in which rods 14 are stored prior to application to the blank; a pair of rod transfer mechanisms 42 for removing a pair of rods from the magazines and for applying them to the first glue lines 24 on the blank while motion of the blank is stopped; and drive means and control means whereby component parts of mechanism 26 are driven and operated in synchronism.

Since the pair of magazines 41 are identical to each other but reversely disposed, and since the rod transfer mechanisms 42 are also identical to each but reversely disposed, only one magazine 41 and its associated rod transfer mechanism 42 are hereinafter described in detail.

FIGS. 4 through 16 show structural details of the rod applicator mechanism 26 in accordance with the invention. FIGS. 33 through 37 show details of the pneumatic system for the rod transfer mechanisms 42 of the rod applicator mechanism 26. FIG. 38 is a timing chart showing the sequence of operation of the components of mechanism 26 during one cycle of operation. i.e., processing of one blank 12. FIGS. 23 through 30 schematically show the position of certain components of the mechanism 26 during one cycle of operation.

Referring to FIGS. 4 through 16, the blank conveyor means 40 of the rod applicator mechanism 26 includes the supporting framework or structure 34 on which a flat, horizontally disposed flat blank supporting table surface 44 is mounted and on which the blanks 12 are supported. Three pairs or sets of constantly driven rollers 45, 46, and 47 are provided which are herein referred to as constantly closed nip infeed rollers 45, cam-controlled open/close nip rollers 46, and constantly closed nip outfeed rollers 47. Each pair of rollers 45, 46 and 47 comprises a free-wheeling upper roller 45A, 46A and 47A, respectively, located above table surface 44, and a driven lower roller 45B, 46B and 47B, respectively, located below but extending through openings 48A, 48B and 48C, respectively, in table surface 44. The upper rollers 45A, 46A and 47A are mounted for rotation on an upper frame 49 which is shown in its operating position but which is understood to be movable to a raised position (not shown) upon release of a latch 50 to afford access to the components therebelow. The lower rollers 45B and 47B are mounted for rotation on framework 34A but lower roller 46B, which is also reciprocably movable up and down, is mounted for rotation on a movable link 51 which, in turn, is pivotally mounted by a pivot pin or shaft 52 on framework 34A.

Figure 6:
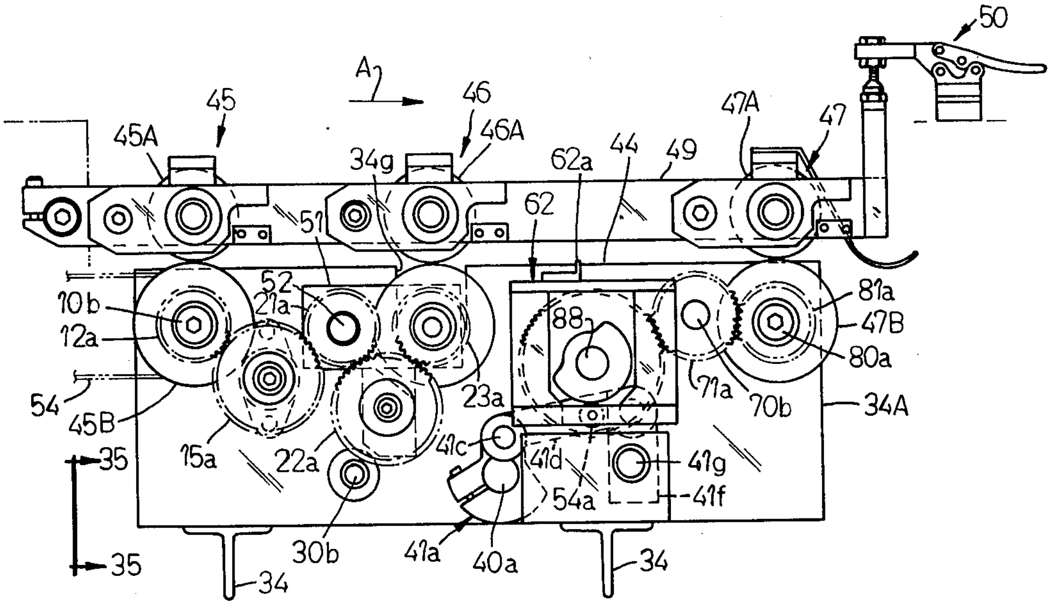
FIG. 6 is a side elevational view of one side of the blank conveyor mechanism taken on line 6—6 of FIG. 5.
Figure 7:
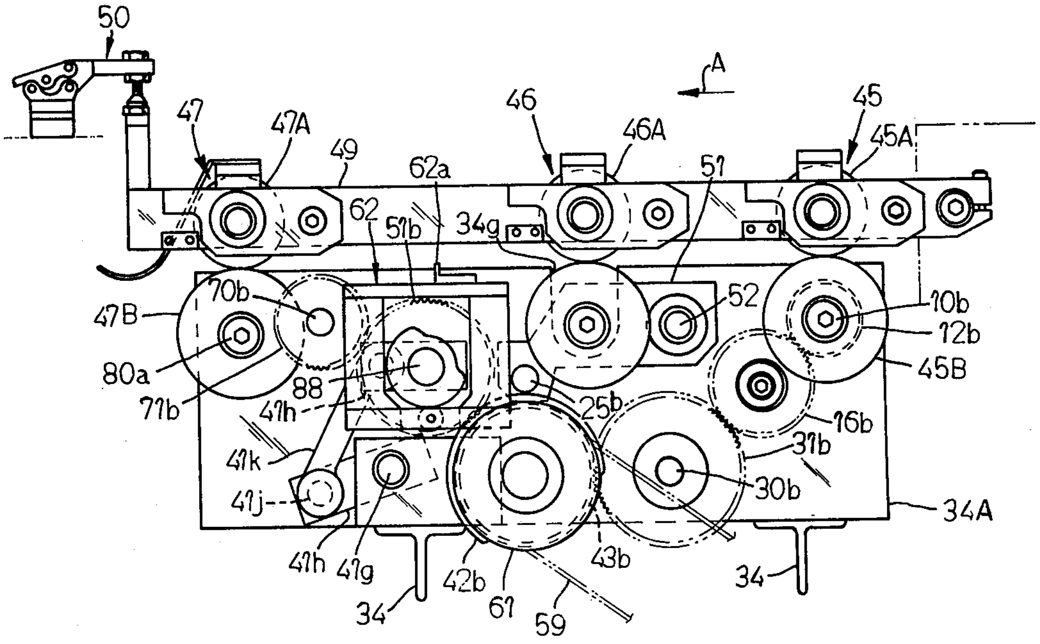
FIG. 7 is a side elevational view of the opposite side of the blank conveyor mechanism taken on line 7—7 of FIG. 5.
Figure 8:
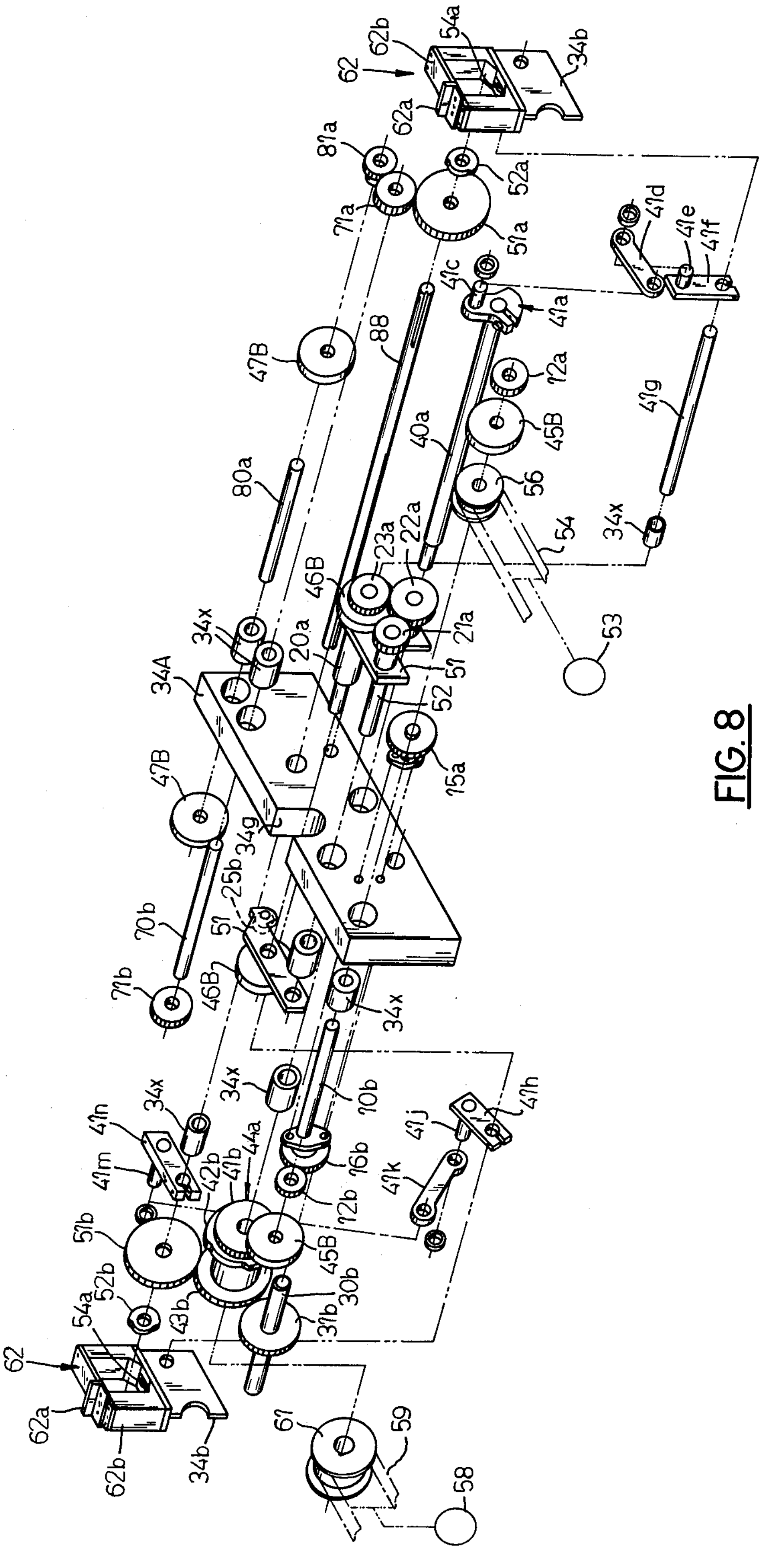
FIG. 8 is an exploded perspective view of the blank conveyor mechanism shown in FIGS. 4, 5, 6, and 7.

As FIGS. 6, 7 and 8 show, the lower rollers 45B, 46B, and 47B are rotatably driven by an electric motor 53 through a gear train hereinafter described. The lower roller 46B is also movable downwardly and upwardly between open and closed nip positions, respectively, by means of electric motor 53 through an oscillating mechanism hereinafter described. A blank stop member 62, hereinafter described, is also moved upwardly and downwardly through an opening 63 in table surface 44 by means of motor 53 to momentarily stop the blanks 12. Another motor 58 is provided to drive a finger plate 67 and an applicator bar 68 of the rod transfer mechanism 42 which are hereinafter described in detail.

Figure 11:
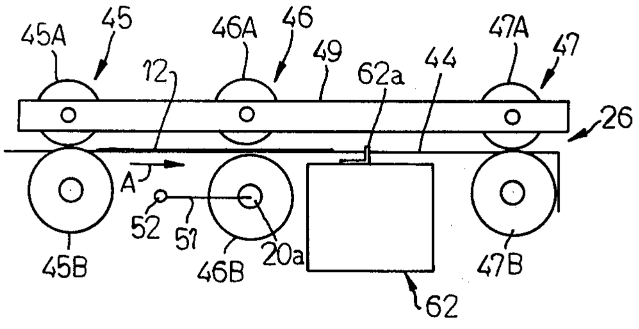
FIGS. 11, 13 and 15 are schematic side elevational views of the mechanisms shown in FIGS. 5-8 and depict the sequence of movement of a blank therethrough.
Figure 13:
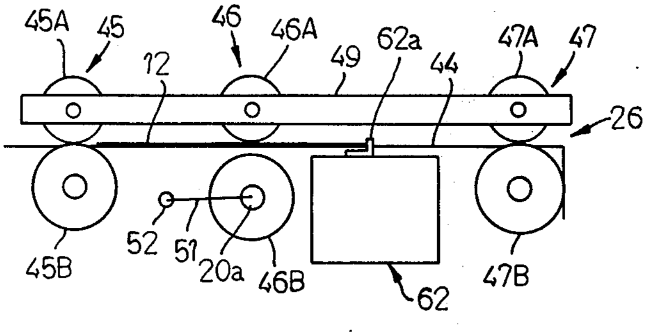
Figure 15:
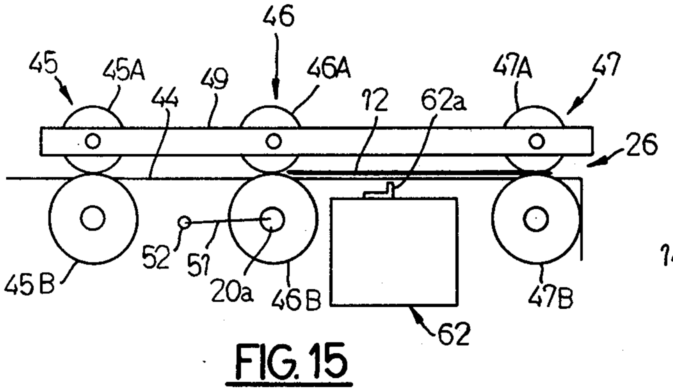

As FIGS. 11, 13 and 15 show, a blank 12 is received between the constantly closed nip of infeed rollers 45 and advanced across table surface 44 into mechanism 26. At this point in the cycle (see chart in FIG. 38), the nip of the cam-controlled rollers 46 is open and the blank 12 passes therethrough. After leaving the nip of the infeed rollers 45, blank 12 is then moving forwardly under its own momentum and comes to a stop when its leading edge strikes stop member 62a which, at this point in the cycle, is moved into raised position. While blank 12 is thus momentarily stopped, the rod transfer mechanism 42 apply the rods 14 to the first glue patterns 24 thereon, as hereinafter described in detail. After the rods 14 are applied, the stop member 62a is moved from raised to lowered position (see FIG. 15) and out of the path of blank 12, whereupon the nip of the cam controlled rollers 46 is closed upon the blank. When this occurs, blank 12 is propelled forward by the rollers 46 between the constantly closed nip of the outfeed rollers 47 and advanced by the latter for further processing.

The aforementioned gear train and oscillating mechanism driven by motor 53 are shown in FIG. 8. More specifically, motor 53, acting through a drive belt 54 on a pulley 56, drives a shaft 10*b* on which rollers 45B are secured for rotation with shaft 10*b*. Shaft 10*b*, and other shafts hereafter referred to in connection with FIG. 8, are mounted for rotation in suitable bearings 34 on a center frame 34A which is part of the framework 34. Shaft 10*b* has affixed thereto gears 12*a* and 12*b*. Gear 12*a* is in constant mesh with an idler gear 15*a* which, in turn, is in contact mesh with a gear 21*a* which is part of a gear train which also includes gears 22*a* and 23*a*. Gear 23*a* is affixed to a shaft 20*a* on which the rollers 46B are mounted for rotation with shaft 20*a*. Gear 12*b* is in constant mesh with an idler gear 16*b* which, in turn, is in constant mesh with a gear 31*b* which drives a gear 41*b* which is part of a hub 44*a* which includes a gear 43*b* and a cam 42*b*. Gear 43*b* drives a gear 51*b* which is mounted for free-wheeling rotation on an oscillator shaft 88. The hub 44*a* is mounted for free-wheeling rotation on an applicator drive shaft 40*a*. The gear 51*b* engages and drives a gear 71*b* which is mounted on one end of and drives a shaft 70*b*. On the other end of shaft 70*b* there is mounted a gear 71*a* which engages and drives a gear 81*a*. The gear 81*a* is fixed to a shaft 80*a* on which the rollers 47B are mounted for rotation by shaft 80*a*. The arrangement thusfar described effects rotation of the rollers 45B, 46B and 47B at a constant and equal speed. The means for raising and lowering the blank stop member 62 will now be described.

Figure 9:
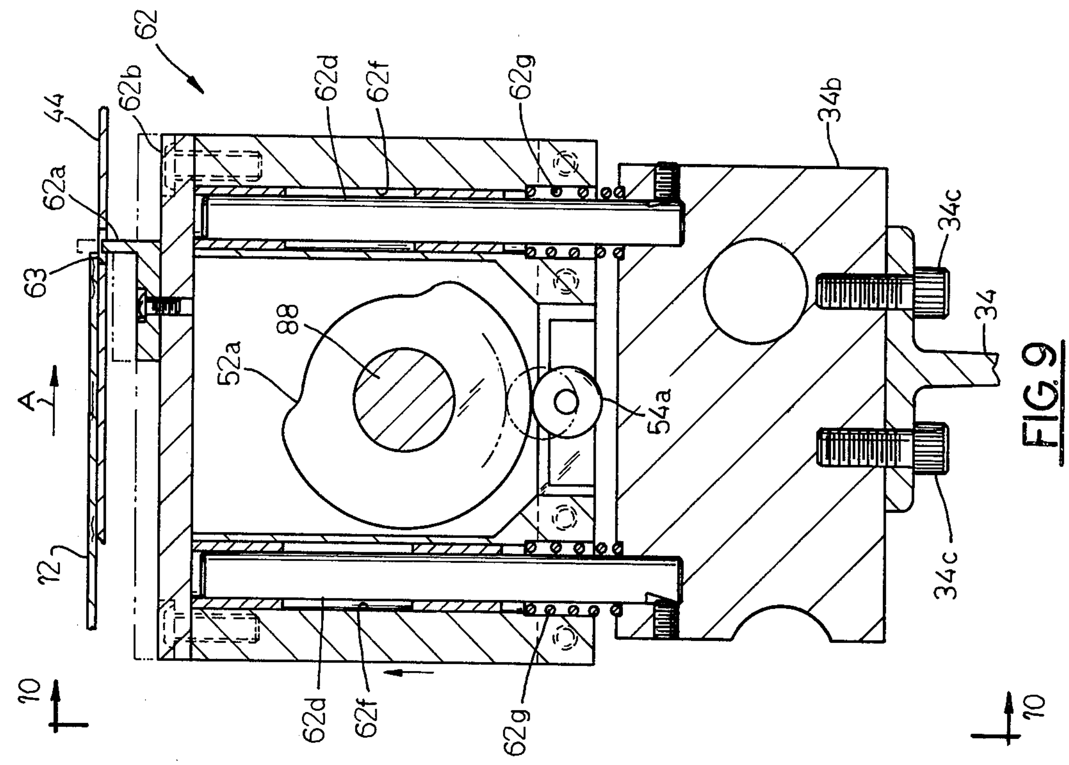
FIG. 9 is an enlarged cross-sectional view of the blank-stopping mechanism of the blank conveyor mechanism taken on line 9—9 of FIG. 5.
Figure 10:
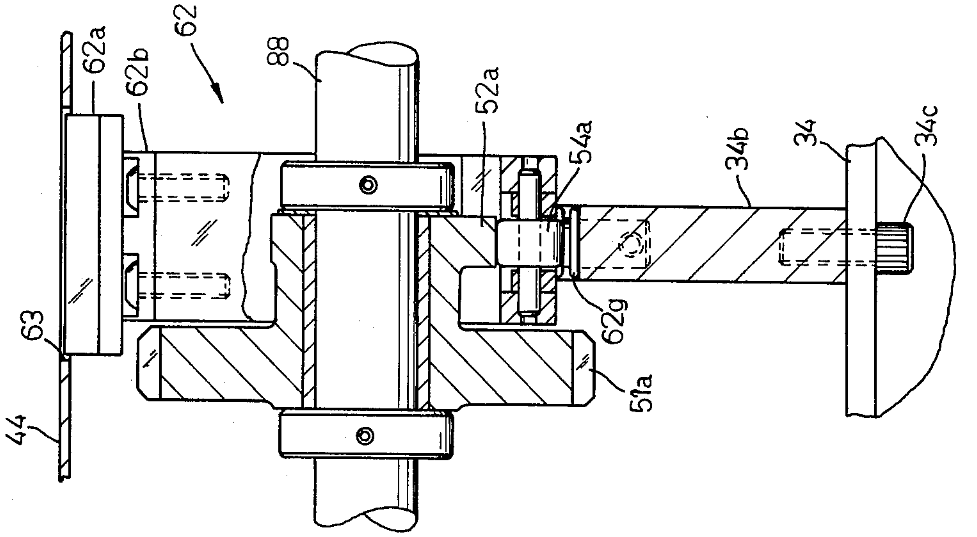
FIG. 10 is a cross-sectional view taken on line 10—10 of FIG. 9.

As FIGS. 8, 9 and 10 show, one end (the right end in FIG. 8) of shaft 88 carries a gear 51*a* which is freely rotatable thereon, being driven by the gear 71*a*. Gear 51*a* is rigidly connected to a cam 52*a* which is rotatable with gear 51*a*. The other end (the left end in FIG. 8) of shaft 88 carries the aforementioned gear 51*b*, which gear is rigidly connected to a cam 52*b* (similar to cam 52*a* ) which is rotatable with gear 51*b*. Each cam 52*a* and 52*b* engages a cam follower 54*a* which is located on a stop member 62. As each cam 52*a*, 52*b* rotates, it causes its associated stop member 62 to move up and down (see FIGS. 9, 11, 13 and 15). The construction of a stop member 62 is shown in detail in FIGS. 9 and 10 and is seen to comprise a member 62*a* at the top thereof which, when raised, engages a blank 12 to arrest its forward progress. Member 62*a* is rigidly secured to a movable upper framework 62*b* which is vertically movable by cam 52*a* relative to a stationary lower framework 34*b* which is secured to framework 34 by bolts 34*c*. The vertical motion of upper framework 62*b* is guided by two vertically disposed guide rods 62*d* wich are rigidly secured to lower framework 34*b* and extend into guide rod slots 62*f* in the upper framework 62*b*. Biasing springs 62*g* are provided on the guide rods 62*d* to bias the upper framework 62*b* upwardly. Cam 52*a*, acting on cam follower 54*a*, tends to move framework 62*b* downward, thereby removing member 62*a* from the path of a blank 12.

The means for raising and lowering the lower roller 46B upwardly and downwardly will now be described. As FIGS. 6, 7 and 8 show, lower roller 46B is affixed to an end of the shaft 20*a* and is rotatable therewith as gear 23*a* rotatably drives the shaft 20*a*. Shaft 20*a* is rotatably mounted on a pair of pivotably movable links 51 and is movable in a clearance slot 34*g* in center frame 34A. Both links 51 are pivotably mounted on shaft 52 and the latter shaft is rotatably supported on center frame 34A. The link 51 at the left side in FIG. 8 is provided with a cam follower 25b which is engageable with the cam 42b of hub 44a and as the cam rotates, the links 51 and the roller 46B thereon is raised and lowered. As will be noted, the gears 21a, 22a and 23a on the right hand link 51 in FIG. 8 move together as a unit as the links 51 pivot up and down, but gear 21a remains in constant mesh and driven engagement with gear 15a. The cam shapes, gear sizes and rotational speeds of all components shown in FIG. 8 are so related that up and down movement of rollers 46B and stop member 62 are synchronized in accordance with the timing chart shown in FIG. 38.

Figure 4:
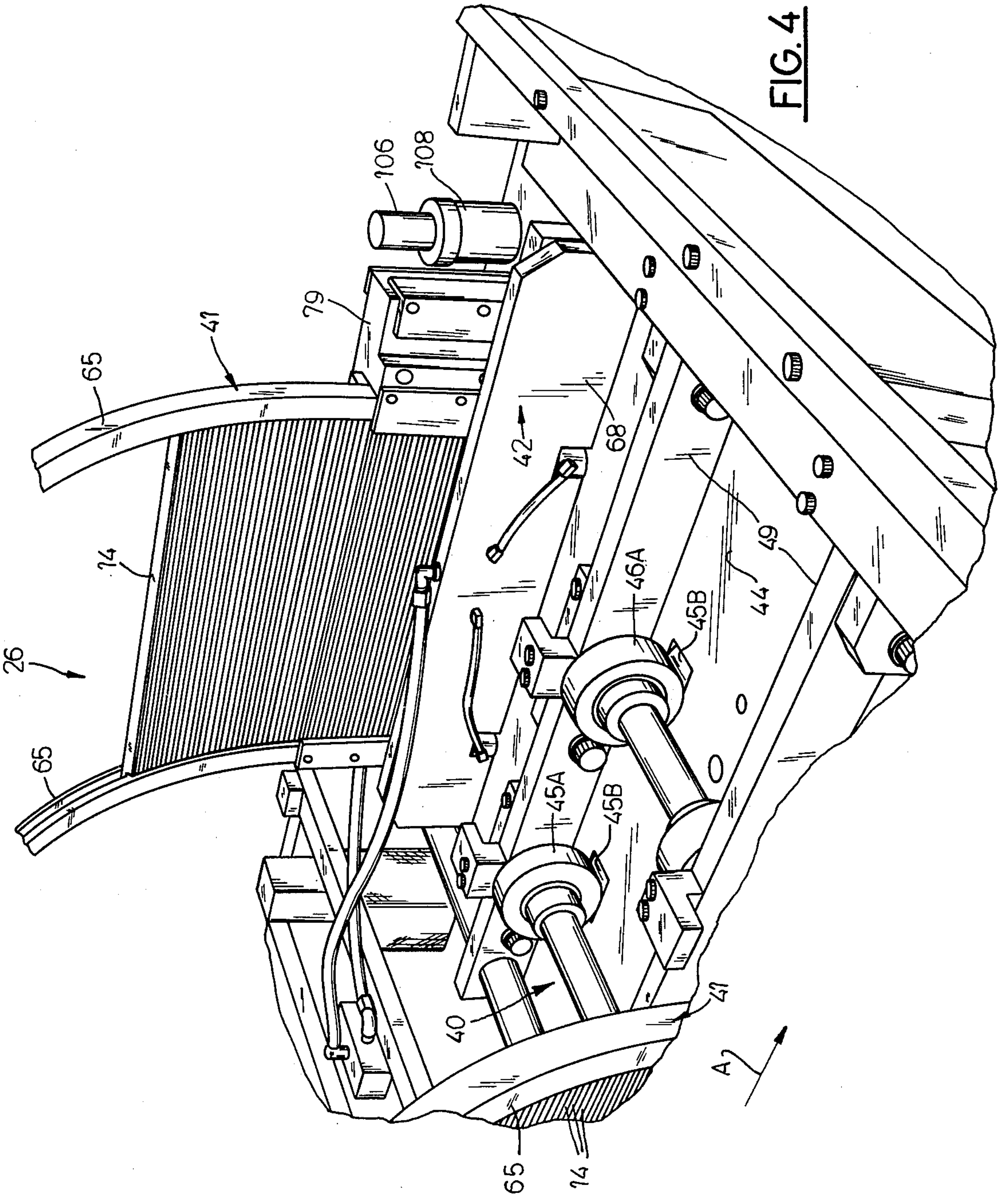
FIG. 4 is an enlarged perspective view of the blank conveyor mechanism and one rod-holding magazine of the machine of FIG. 1.
Figure 5:
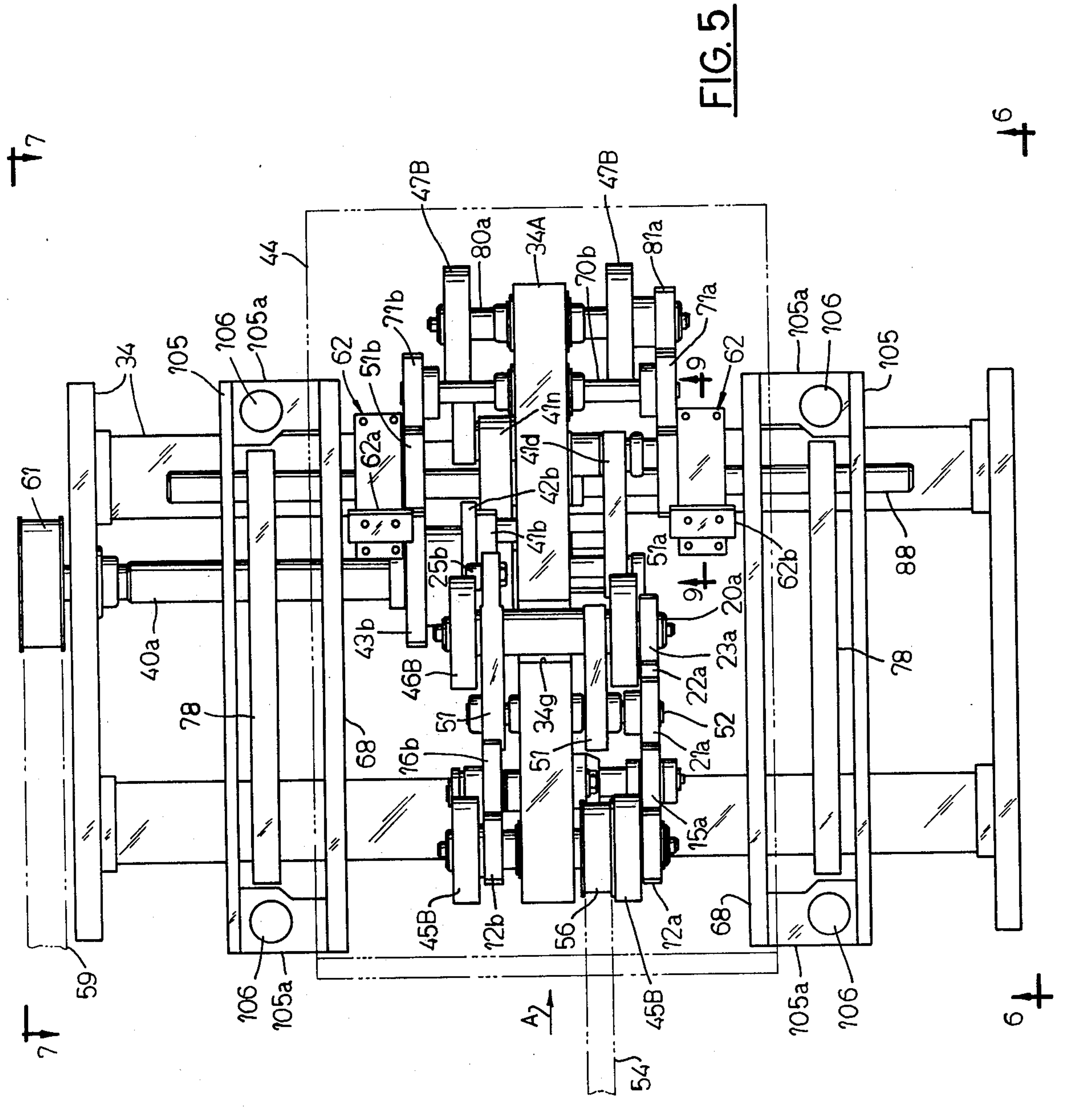
FIG. 5 is a top plan view of the blank conveyor mechanism shown in FIGS. 1 and 4.
Figure 18:
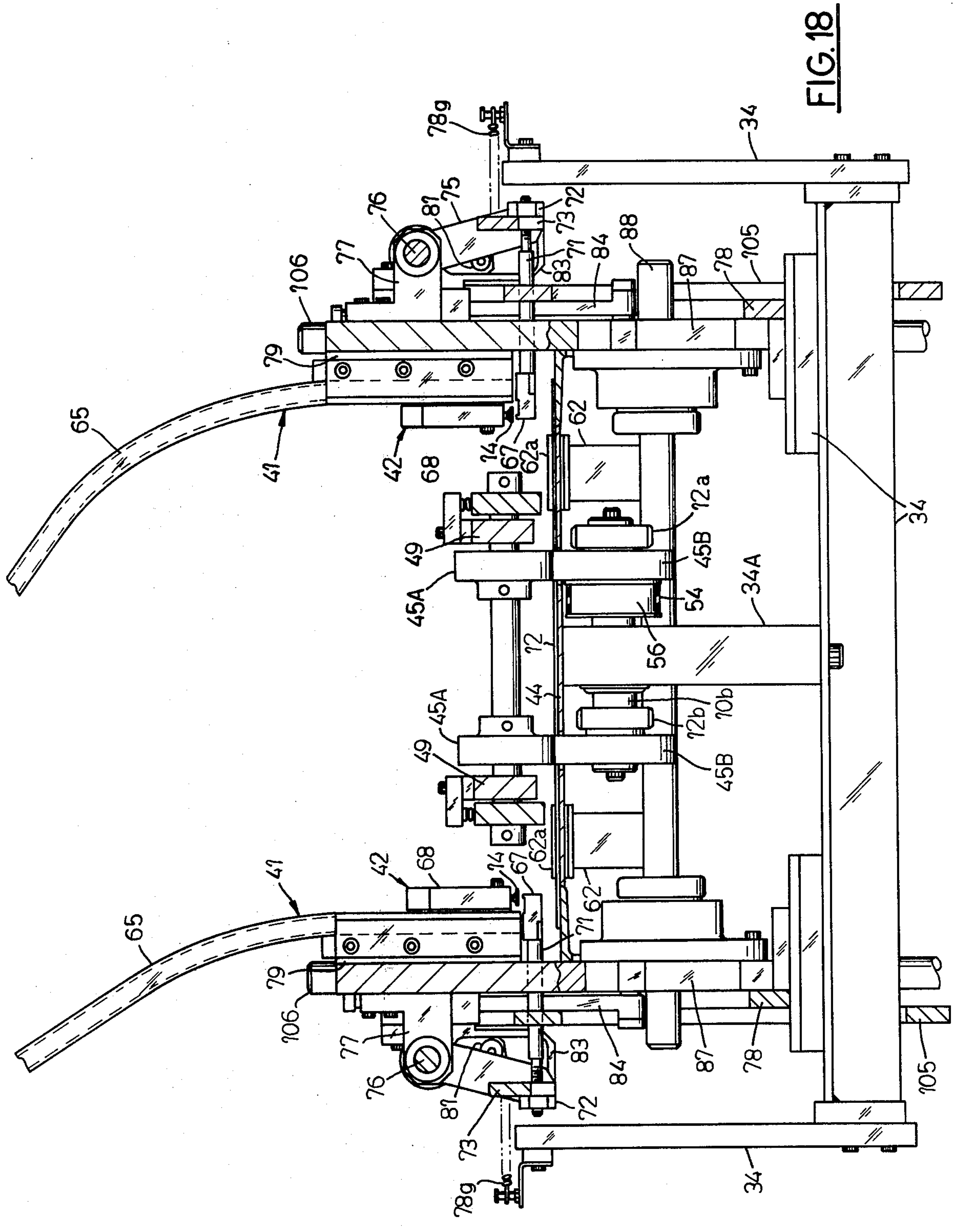
FIG. 18 is a view, partly in cross section, taken on line 18—18 of FIG. 17.

As FIGS. 1, 4 and 18 best show, each rod holding magazine 41 comprises a pair of spaced apart slightly curved end rails 65, each of generally U-shaped cross-sectional configuration, which extend upwardly in a slight curve from framework 34 in mechanism 26. The rails 65 are spaced apart from each other in the longitudinal direction of machine 10, i.e., in the direction of movement of the blanks 12 therethrough designated by arrow A. The rails 65 define a magazine 41 in which a plurality of flat elongated horizontally disposed rods 14, fabricated of metal or plastic, are vertically stacked one above the other with the flat sides of the rods facing upwardly and downwardly. The magazine 41 is open at the top and rods 14 inserted at the top eventually exit one at a time at the bottom in succession under the force of gravity through bottom or rod dispensing opening 66.

Figure 27:
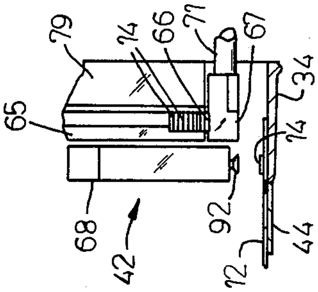
Figure 28:
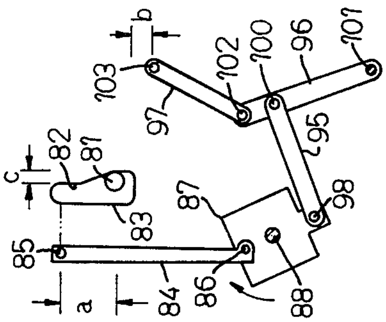
Figure 25:
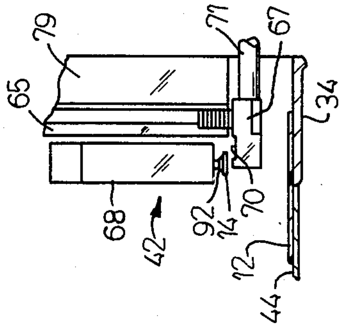
Figure 26:
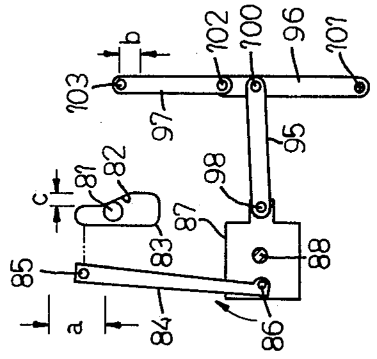
Figure 23:
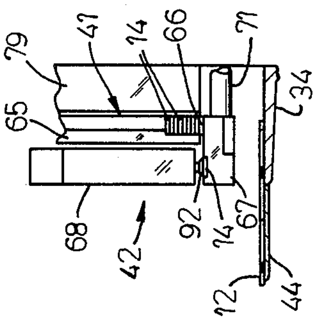
Figure 24:
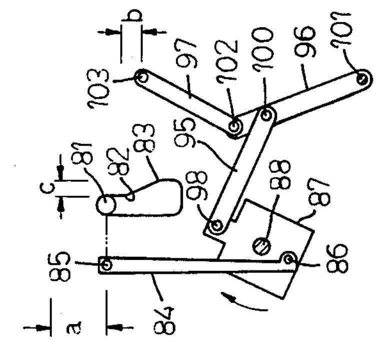

Each magazine 41 is associated with a rod transfer mechanism 42 whereby a rod 14 in the magazine is individually removed from the bottom opening 66 of the magazine and precisely and rapidly applied to a first glue line 24 on a blank 12. The rod transfer mechanism 42 comprises a finger plate 67 which is located below the magazine 41 and which is reciprocably movable horizontally with respect thereto along a horizontal path 67A by means hereinafter described. The rod transfer mechanism 42 also comprises an applicator bar 68 which is located alongside the magazine 41 on the inboard side thereof (i.e., on the side nearest the blank 12) and which is reciprocably movable vertically along a path 68A with respect to the finger plate path 67A by means hereinafter described. Finger plate 67 takes the form of an elongated rigid member having an upper surface 69 in which an elongated rod receiving groove or recess 70 is provided. Finger plate 67 is horizontally movable during one cycle of operation from a fully retracted position (see FIG. 27) wherein groove 70 is directly below and aligned with magazine bottom opening 66 (and wherein a rod 14 falls into the groove), to a partially extended position with a rod 14 thereon (see FIG. 29), to a fully extended position (see FIG. 23) wherein groove 70 is directly below and aligned with the path of movement of the applicator bar 68, to a partially retracted position (see FIG. 25), and then back to fully retracted position (FIG. 27). When groove 70 moves away from magazine bottom opening 66, the upper surface 69 of finger plate 67 lies sufficiently close to opening 66 to prevent a rod 14 from passing through opening 66.

Figure 29:
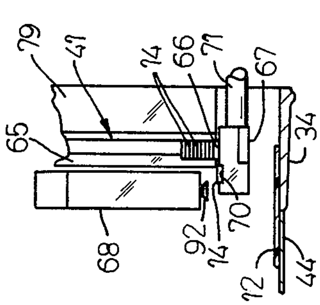
FIGS. 23, 25, 27, and 29 are schematic views of the rod transfer mechanism shown in FIG. 22 and showing it in sequential operating positions.
Figure 30:
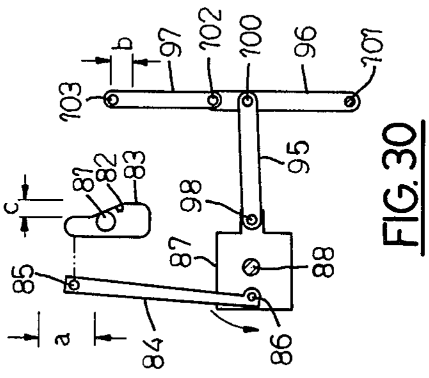
FIGS. 24, 26, 28, and 30 are schematic views of the rod transfer mechanism drive means shown in FIG. 21 and showing it in sequential operating positions corresponding to the rod transfer mechanism positions shown in FIGS. 23, 25, 27, and 29, respectively.

Applicator bar 68 is vertically movable during one cycle of operation from a fully raised position (see FIG. 29), down to a rod contacting position (see FIG. 23), back up to an intermediate raised clearance position (see FIG. 25), back down to a fully lowered rod deposit position (see FIG. 27), and then back up again to fully raised position (see FIG. 29).

As FIGS. 18, 19, 20, 21, 22, 24, 26, 28, 30 and 31 show, finger plate 67 is movable by means of a pair of finger plate drive rods 71 which are rigidly connected to and extend outwardly from the side of plate 67. The outer ends of the drive rods 71, which is slideably extend through bearing sleeve 78A in a mounting plate 78 (see FIG. 34), are threaded and rigidly connected by nuts 72 to an elongated horizontally disposed laterally shiftable support member 73. (see FIGS. 21 and 22) which has pivot pins 74 at opposite ends thereof. Biasing springs 73g connected between member 73 and framework 34 bias member 73 laterally outwardly thereby biasing the finger plate 67 into retracted position. The pins 74 are pivotally connected to the lower ends of a pair of levers 75 which have their upper ends rigidly connected to a rocker shaft 76 which is journalled for oscillatory rotation on a pair of spacedapart supporting brackets 77 which are rigidly secured to a mounting plate 78. Mounting plate 78 is rigidly secured near the top of a frame 79 which, in turn, is rigidly mounted on framework 34. Rocker shaft 76 has a cam roller support plate 80 rigidly secured to one end thereof and plate 80 carries a rotatable cam roller 81 which is movable horizontally a distance C (see FIG. 24). The cam roller 81 is disposed within and engages the edge of a cam slot 82 in a cam plate 83, which cam plate is rigidly secured to vertically and reciprocably movable slide block 84A and moves vertically a distance a (see FIG. 24). Block 84A slides in tracks 78a in mounting plate 78. Block 84A is secured against displacement by guides 84b. The cam plate 83 is driven upwardly and downwardly by a drive rod 84 which is connected thereto at its upper end by a pivot pin 85 which is secured on block 84A. The lower end of drive rod 84 is connected by a pivot pin 86 to an oscillatory plate 87 which is mounted on and oscillatably movable with an oscillating shaft 88. Shaft 88 is driven as hereinafter described. Oscillating plate 87 is also connected to a linkage which effects upward and downward movement of applicator bar 68 and such linkage, shown in FIGS. 18 through 22 and 24, 26, 28 and 30, comprises three links designated 95, 96 and 97. Link 95 is pivotally connected at one end by a pin 98 to plate 87 and at its other end by a pin 100 to link 96 intermediate the ends of the latter. Link 96 is pivotally connected at one end by a pin 101 to supporting frame 34 and at its other end by a pin 102 to one end of link 97. The other end of link 97 is connected by a pin 103 to a reciprocably movable frame 105 on which applicator bar 68 is mounted. Pin 103 is movable vertically to a distance b (see FIG. 24) to effect corresponding movement of plate 105. Frame 105 is slideably mounted on a pair of support rods 106 which are mounted on framework 34.

Figure 19:
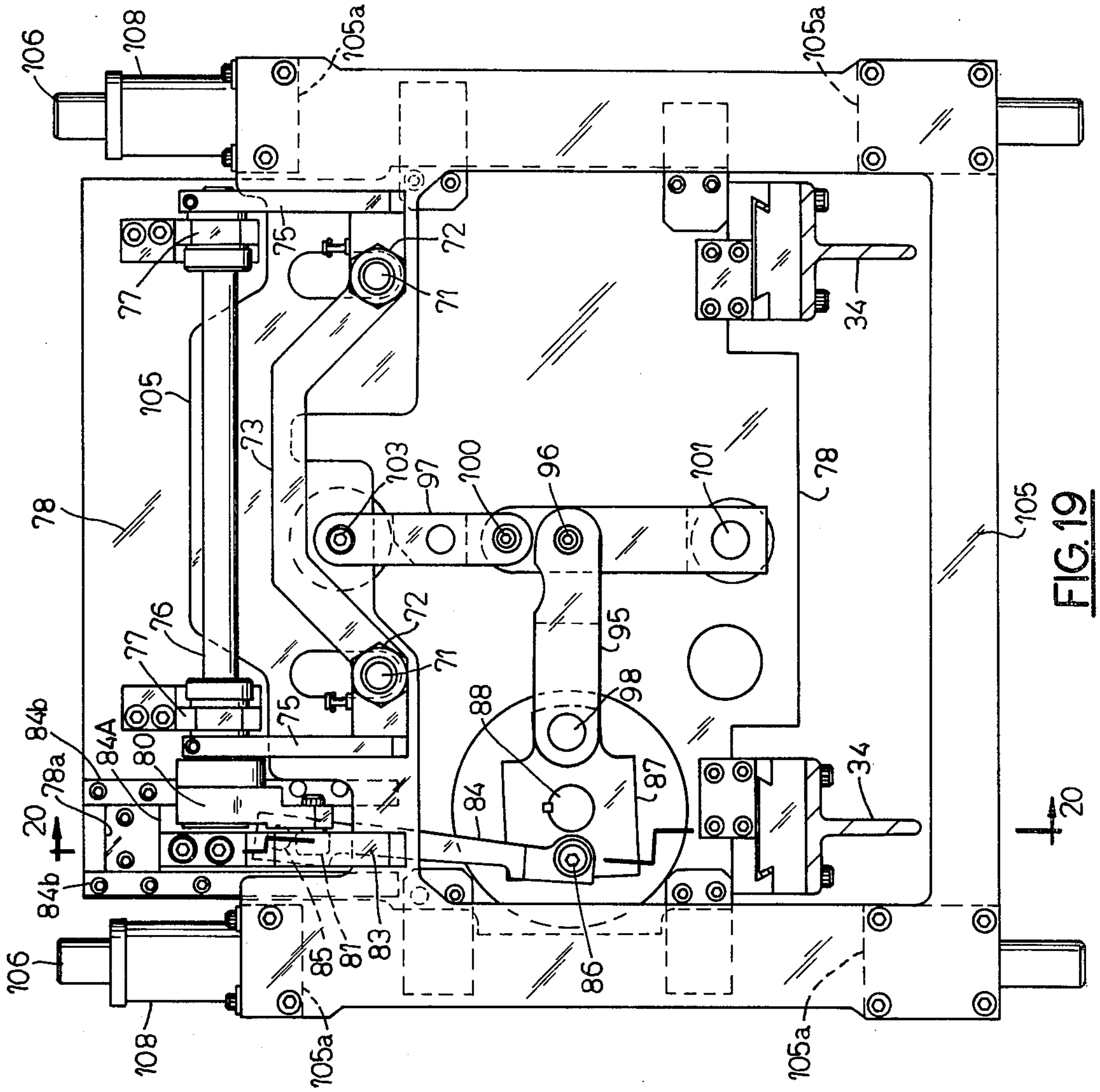
FIG. 19 is a view, partly in cross section, taken on line 19—19 of FIG. 17.
Figure 20:
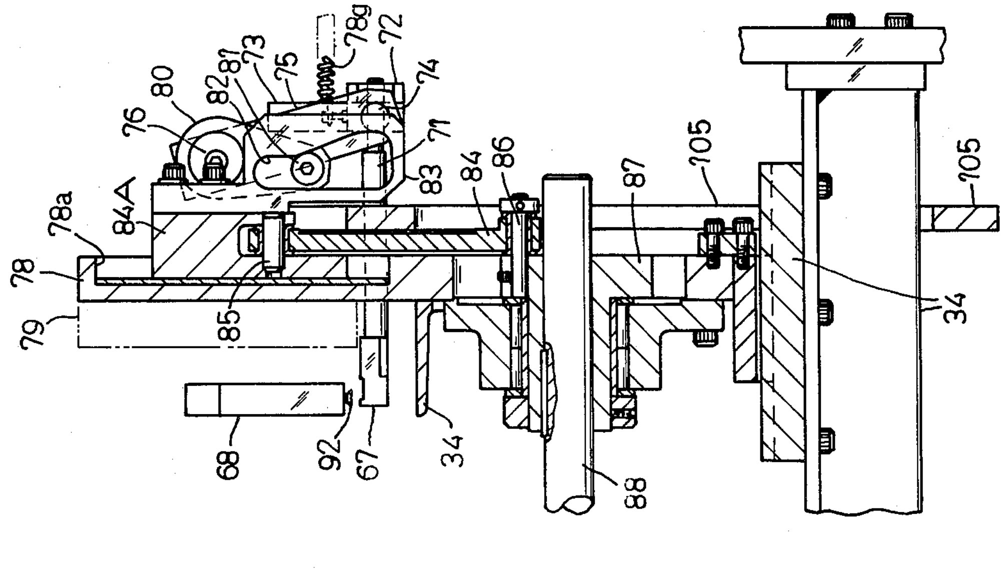
FIG. 20 is a view, partly in cross section, taken on line 20—20 of FIG. 19.
Figure 21:
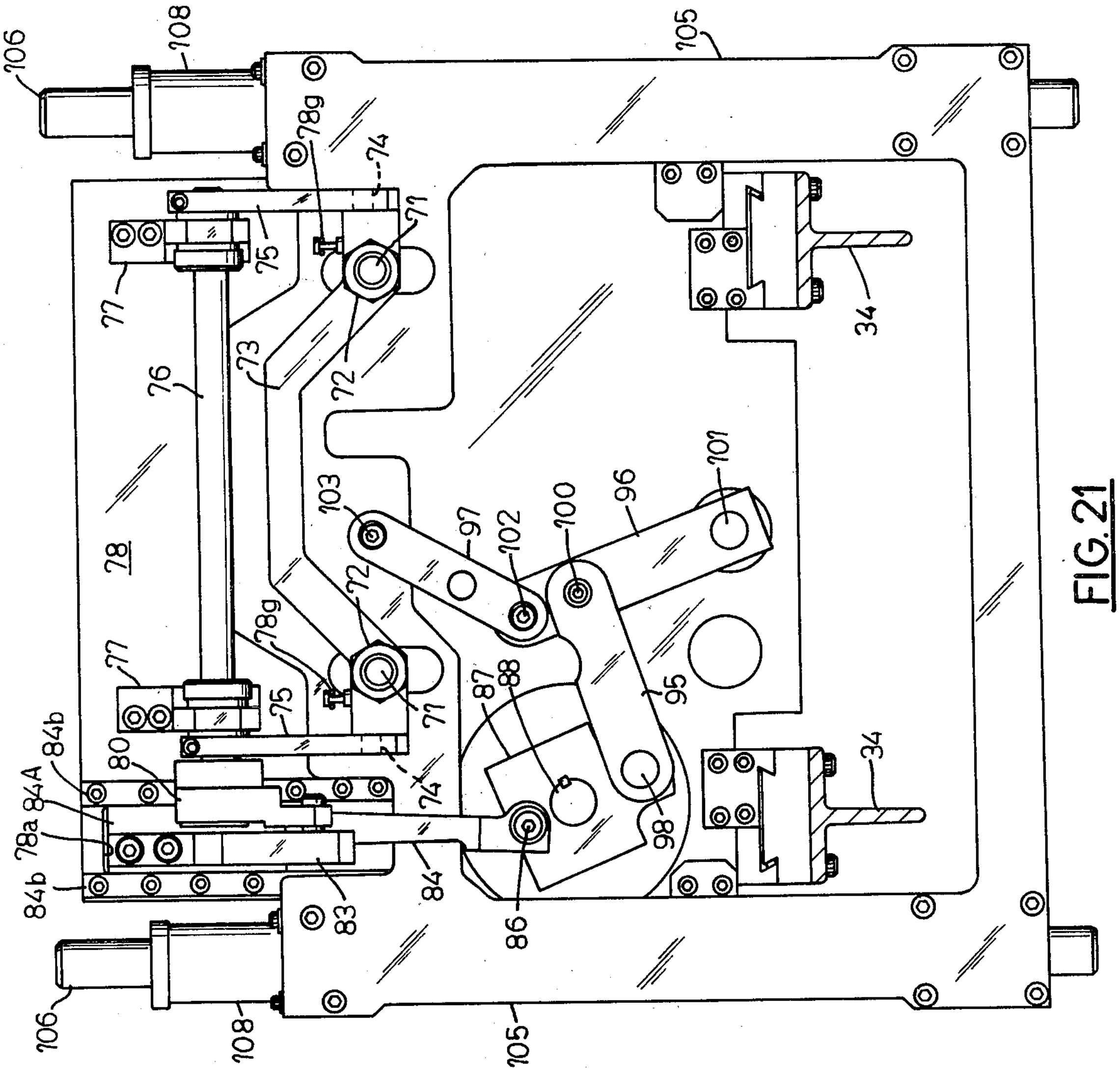
FIGS. 21 and 22 are views similar to FIGS. 19 and 20, respectively, but showing components in another operating position.
Figure 22:
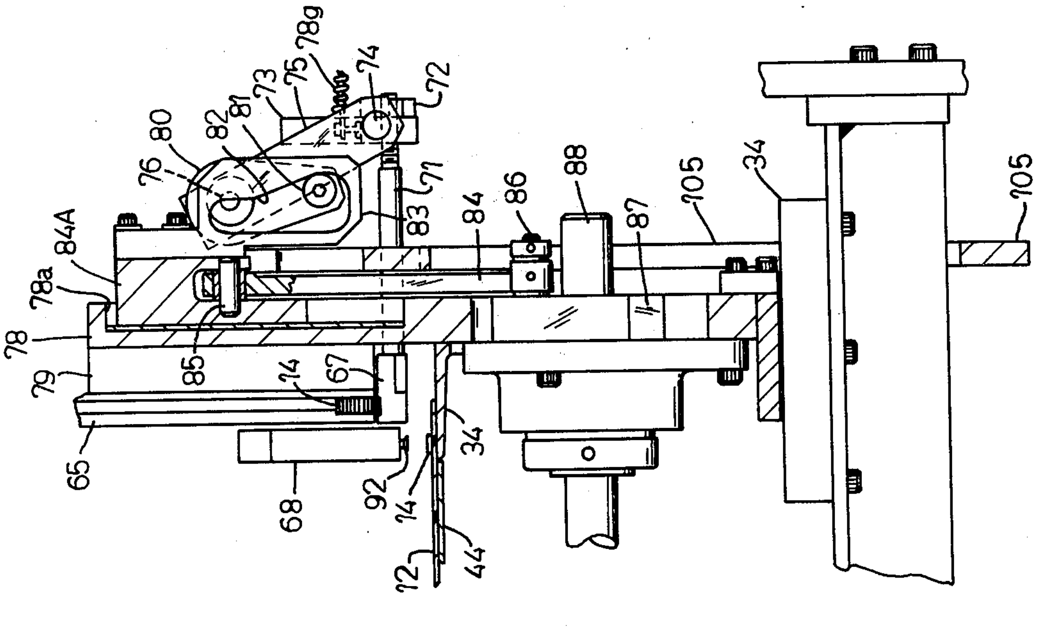
Figure 33:
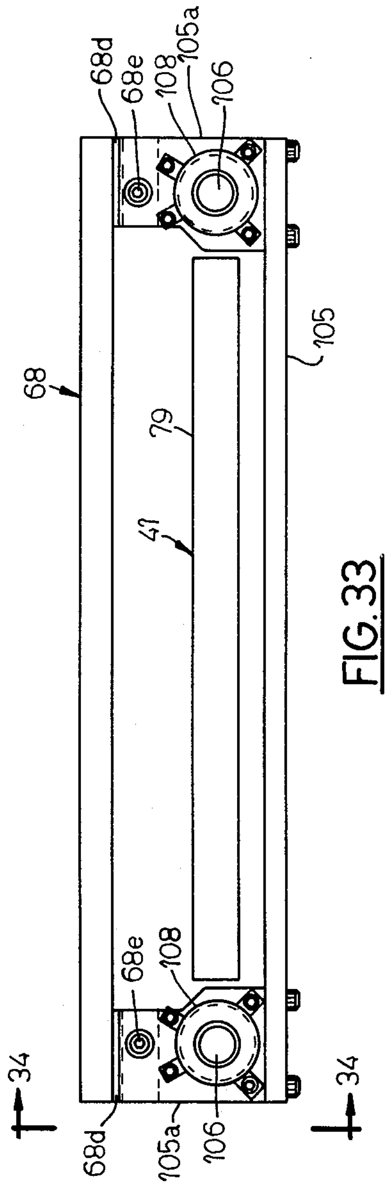
FIG. 33 is an enlarged top plan view of the support means of the rod applicator bar shown in FIG. 17.
Figure 34:
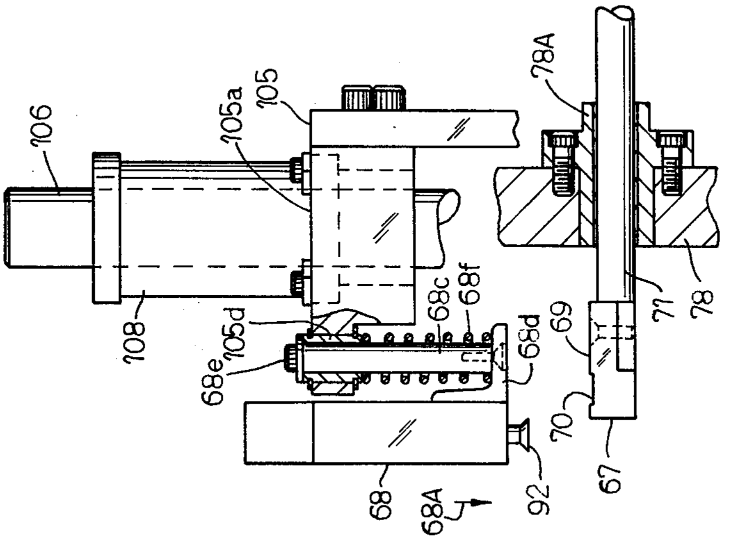
FIG. 34 is a view, partly in cross section, taken on line 34—34 of FIG. 33.
Figure 36:
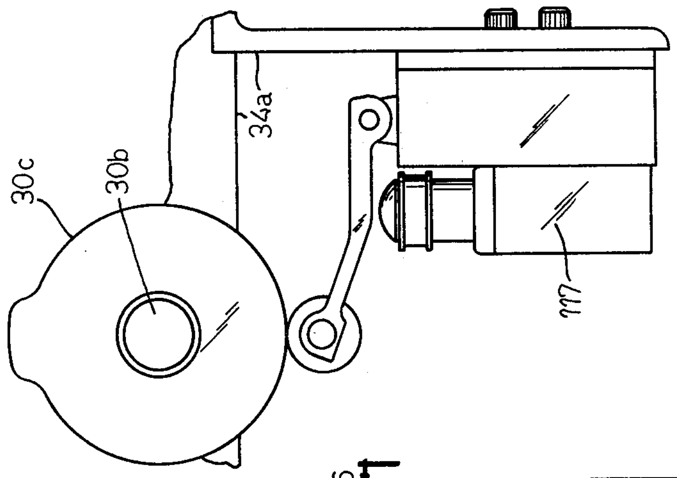
FIG. 36 is a view taken on line 36—36 of FIG. 35.

As FIGS. 19, 33 and 34 show, the rods 106 and framework 34 are stationary, whereas the applicator bar 68 is mounted on the vertically movable frame 105. Movable frame 105 comprises two sets of linear bearings 108 which are slideable on a pair of rods 106.

Each uppermost linear bearing 108 is rigidly connected to an upper bearing support block 105a which is part of frame 105. Each upper bearing support block 105a comprises a sleeve 105b in which a slideable guide pin 68c is mounted. The lower end of pin 58c is rigidly connected to a bracket 68d which, in turn, is rigidly connected to a bracket 68d which, in turn, is rigidly connected to a side of applicator bar 68. The upper end of pin 68c is provided with a stop washer 68e which is rigidly secured thereto. A biasing spring 68f surrounds pin 68*c* and tends to bias the applicator bar 68 downward relative to block 105*a* (see FIG. 34). In operation, when block 105*a,* pin 68*c* and applicator bar 68 move downward and the rod contact portions 92 engage either a rod 14 in the groove 70 in finger plate 67 (or when a rod 14 being carried by the applicator bar 68 touches the glue line on which it is being deposited), the spring 68*f* and pin 68*c* enable or allow the support block 105*a* to overtravel in downwardly direction without causing the applicator bar to travel further downwardly. Thus, there is no danger of downward motion of the applicator bar 68 damaging the finger plate 67 or the table 44 on which the blanks 12 move, especially during high-speed operation.

The means for effecting horizontal and vertical reciprocating movement of the finger 67 and the applicator 68, herebefore referred to, will now be described in connection with FIGS. 6, 7 and 8. The hereinbefore referred to oscillating shaft 88 which drives oscillating plate 87 and which also free-wheelingly supports gears 51*a* and 51*b* and, is oscillatably movable by means of motor 58 shown in FIG. 8. Motor 58, acting through a drive belt 59 on a pulley 61, drives a shaft 40*a* which is rigidly connected to and rotatable with pulley 61. Shaft 40*a* which is rotatably supported on center frame 34A, is provided with an eccentric drive assembly 41*a* affixed at its right end (with respect to FIG. 8), which assembly rotates 360° and comprises an eccentric pin 41*c* which is connected to one end of a link 41*d*. The other end of link 41*d* is connected to a pin 41*e* on an eccentric link 41*f*. The eccentric link 41*f* is rigidly connected to one end of and effects oscillating motion (through 90°) of a shaft 41*g* which is mounted on center frame 34A. The other end of shaft 41*g* has an eccentric link 41*h* rigidly connected theretor. The link 41*h* has a pin 41*j* which is connected to one end of a link 41*k*. The other end of link 41*k* is connected to a pin 41*m* on an eccentric drive lever 41*n* which is rigidly connected to oscillating shaft 88. Thus, the continuous 360° rotation of shaft 40*a* is translated to 90° oscillation motion of shaft 41*g* and finally to 130° oscillating motion of shaft 88.

Figure 32:
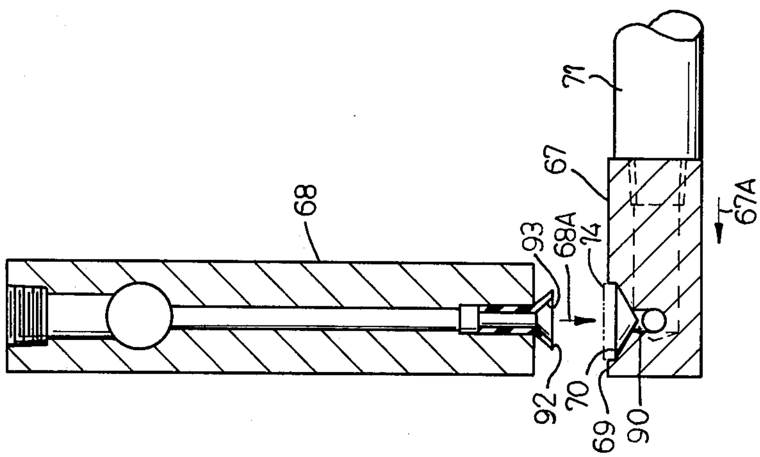
FIG. 32 is an enlarged cross-sectional view of the components of FIG. 31 taken on line 32—32 of FIG. 17.
Figure 31:
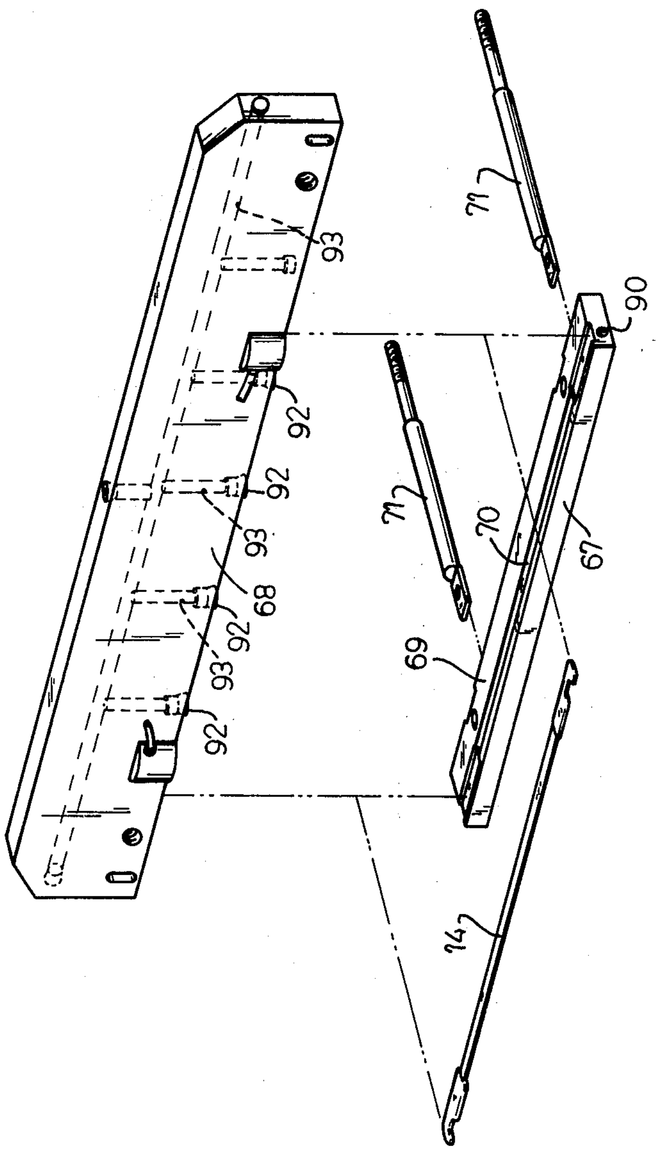
FIG. 31 is an enlarged perspective view of the finger plate and rod applicator bar of the rod transfer mechanism.

As FIGS. 31 and 32 best show, each rod transfer mechanism 42 includes the horizontally movable finger plate 67 having the rod receiving recess 70 therein and fluid ports 90 connected to the recess 70. Each rod transfer mechanism 42 further includes the vertically movable applicator bar 68 having a rod contact portion or surface 92 thereon and fluid ports 93 connected to that portion. As FIGS. 23, 25, 27 and 29 show, the finger plate 67 is reciprocably movable between a retracted position wherein the rod receiving recess 70 is in rod receiving position below the magazine rod dispensing opening 66, and an extended position wherein the recess with a rod 14 thereon is clear of the magazine 41. The applicator bar 68 is reciprocably movable along a vertical path which intersects the horizontal path of the finger plate. When the finger plate 67 with a rod 14 retained in its recess 70 by vacuum at its fluid ports 90 reaches its extended position, the applicator bar 68 descends into contact with the rod 14, whereupon the fluid ports 90 in the finger plate 67 return to atmospheric pressure, and the fluid ports 93 in the applicator bar 68 are vacuumized. Then, the applicator bar 68 with rod 14 attached thereto is raised to enable the finger plate 67 to retract, and the applicator bar 68 descends to place the rod 14 immediately above a glue pattern 24, whereupon the applicator bar fluid ports 93 are pressurized to positively release the rod 14 and the applicator bar 68 is raised.

Figure 35:
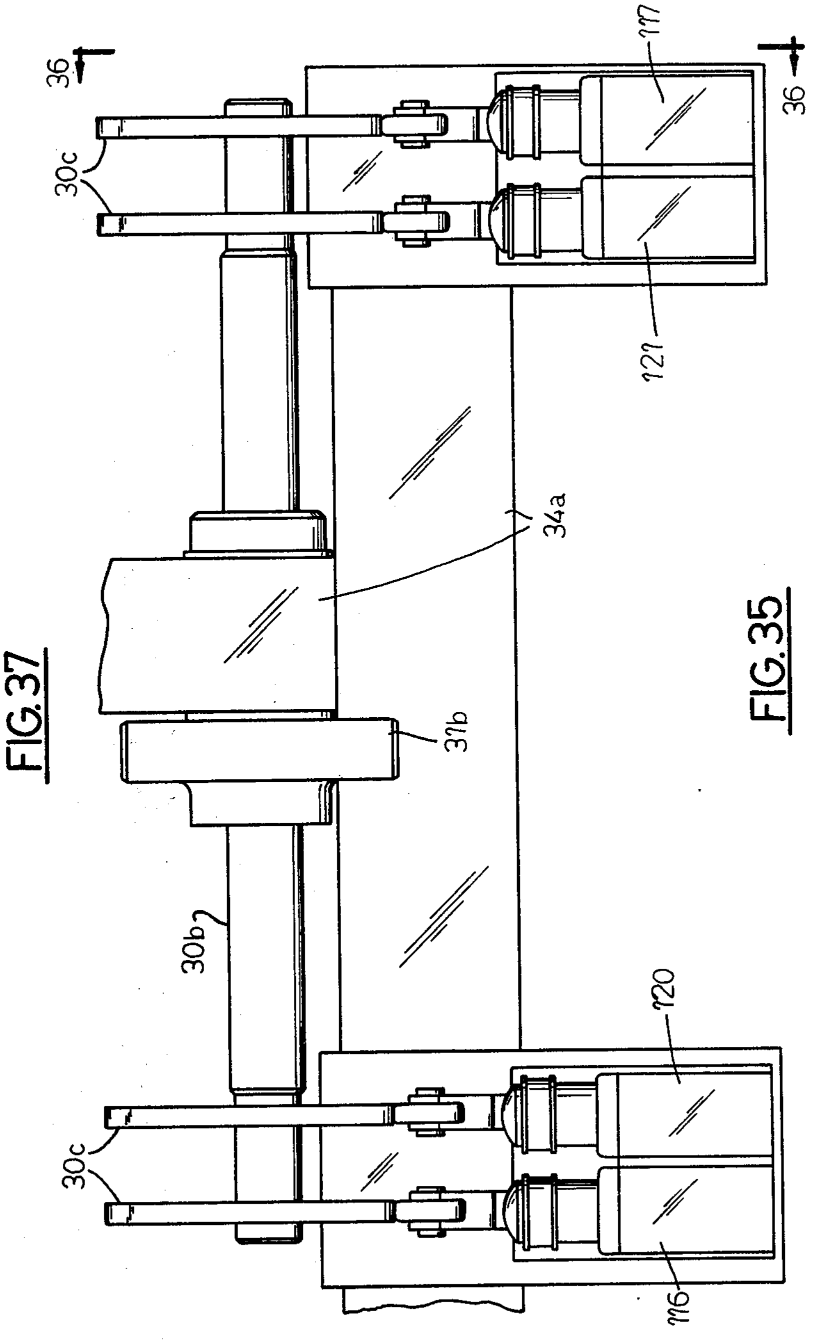
FIG. 35 is an elevational view of the fluid supply and fluid control mechanism for the rod transfer mechanism taken on line 35—35 of FIG. 6.
Figure 37:
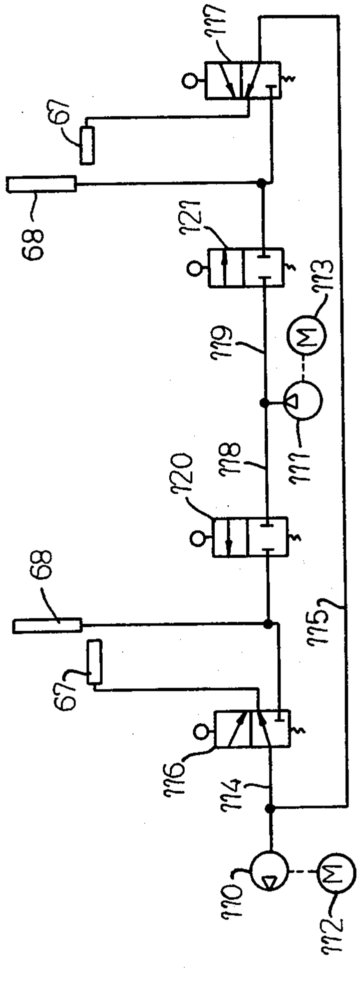
FIG. 37 is a schematic diagram of the fluid supply and fluid control mechanism.
Figure 38:
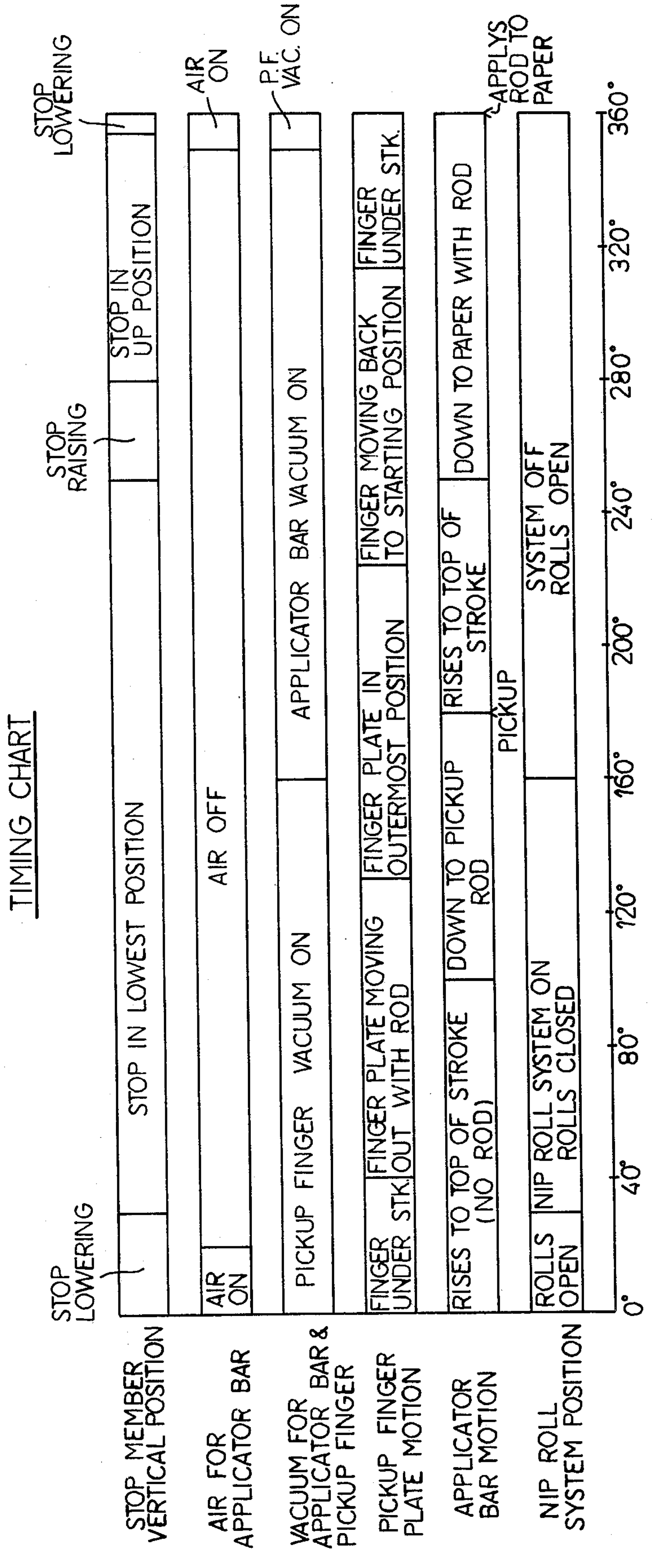
FIG. 38 is a timing chart for the mechanism in the machine in accordance with the invention showing one complete cycle of operation.

As FIGS. 31, 32, 35, 36 and 37 best show, the fluid ports 90 of finger plate 67 and the fluid ports 93 of applicator bar 68 are vacuumized or pressurized, as required (and in accordance with the timing chart shown in FIG. 38), by means of a pneumatic system shown in FIG. 37. This system comprises a vacuum pump 110, an air pump 111, which are constantly driven by electric motors 112 and 113, respectively. Vacuum pump 110 is connected by supply lines 114 and 115 to cam actuated valves 116 and 117, respectively. Air pump 111 is connected by supply lines 118 and 119 to cam actuated valves 120 and 121, respectively. The valves 116 and 117 are operated in synchronism with movement of the finger plate 67, by means of the timing gear 31*b* which is shown in FIGS. 8 and 35, and the valves 120 and 121 are operated in synchronism with movement of the applicator bar 68 by means of timing gear 31*b*. Gear 31*b* is affixed to shaft 30*b* which is mounted for rotation on center frame 34A. Shaft 30*b* is provided with cams 30*c* which operate valves 116, 117, 120 and 121. When the valves are in the condition shown in FIG. 37, the ports 90 in finger plate 67 are vacuumized, and this condition exists while the finger plate 67 is being extended with a rod 14 in its groove 70 to prevent the rod from being flung or dislodged from the groove. As this extending motion of finger plate 67 is occurring, the ports 93 in applicator bar 68 are at atmospheric pressure. However, after finger plate 67 is fully extended and stopped and applicator bar 68 has descended so that its ports 93 of the applicator bar 68 (and return the ports 90 of the finger plate 67 to atmospheric pressure) so that the rod 14 adheres to the applicator bar 68 as it is subsequently raised and then lowered. When applicator bar 68 has fully lowered to a position wherein the rod 14 carried thereby is just above glue line 24, the valves 116 and 117 are actuated to cut off the vacuum to the ports 93 and the valves 120 and 121 are actuated to pressurize the ports 93 of the applicator bar 68 and thereby forceably and positively propel the rod 14 against the glue line. After this occurs, the bar 68 is raised and the cylce is then repeated. Action of the valves 116, 117, 120 and 121 is synchronized with movement of the finger plate 67 and the applicator bar 68, as the timing chart shown in FIG. 38 makes clear.

I claim:

1. In a machine for making hanging file folders, each of which folders comprises a blank and at least one support rod, in combination:

conveyor means for moving said blank along a path, said blank having a glue pattern thereon;

means including a stop member movable into the path of said blank for temporarily engaging and momentarily interrupting movement of said blank along said path;

a rod-dispensing means adjacent said path;

means for transferring a rod from said rod-dispensing means and for applying said rod to said glue pattern while movement of said blank along said path is interrupted, said transferring means including a reciprocably and horizontally movable rod-holding plate and a reciprocably and vertically movable applicator member for removing a rod from said plate and for applying said rod to said glue pattern, said applicator member having at least one fluid aperture therein for association with a rod on said rod-holding plate;

and means for creating suction at and then subsequently pressurizing said fluid port to enable said applicator member to remove a rod from said rod-holding plate and deposit said rod on said glue pattern.

2. A machine according to claim 1 wherein said means for moving said blank along said path comprises a pair of separable rollers between which said blank passes;

and wherein said means for interrupting movement of said blank along said path comprises means to effect separation of said rollers and said stop member movable into the path of movement of said blank.

3. In a machine for making hanging file folders, each of which folders comprises a blank and at least one support rod, in combination:

conveyor means for moving said blank along a path, said blank having a glue pattern thereon, said means for moving said blank along said path comprising a pair of separable rollers between which said blank passes;

means for momentarily interrupting movement of said blank along said path, said means for interrupting movement of said blank along said path comprising means to effect separation of said rollers and a stop member movable into the path of movement of said blank;

a rod-dispensing means adjacent said path;

means for transferring a rod from said rod-dispensing means and for applying said rod to said glue pattern while movement of said blank along said path is interrupted, said transferring means comprising a reciprocably and horizontally movable rod-holding plate and a reciprocably and vertically movable applicator member for removing a rod from said plate and for applying said rod to said glue pattern, said applicator member having at least one fluid aperture therein for association with a rod on said rod-holding plate;

and means for creating suction at and then subsequently pressurizing said fluid port to enable said applicator member to remove a rod from said rod-holding plate and deposit said rod on said glue pattern.

4. In a machine for making hanging file folders, each of which folders comprises a blank and at least one support rod, in combination:

conveyor means for moving said blank along a path, said blank having a glue pattern thereon;

means including a stop member movable into the path of said blank for temporarily engaging and for momentarily interrupting movement of said blank along said path;

a rod-dispensing means adjacent said path;

and means for transferring a rod from said rod-dispensing means and for applying said rod to said glue pattern while movement of said blank along said path is interrupted, said means for transferring a rod from said magazine comprising a reciprocably and horizontally movable rod-holding pate and a reciprocably and vertically movable applicator member for removing a rod from said plate and for applying said rod to said glue pattern, said applicator member having at least one fluid aperture therein for association with a rod on said rod-holding plate;

and means for creating suction at and then subsequently pressurizing said fluid port to enable said applicator member to remove a rod from said rod-holding plate and deposit said rod on said glue pattern.

5. In a machine for making a hanging file folder in which a rod is secured to a blank;

means for conveying a blank with a glue pattern thereon along a path;

a rod-dispensing magazine alongside said path;

means including a stop member movable into the path of said blank for temporarily engaging and for momentarily stopping said blank adjacent said magazine;

a reciprocably and horizontally movable rod-holding plate having a recess therein for receiving a rod from said magazine and moving it to a position above said glue pattern;

a reciprocably and vertically movable applicator member having a fluid port therein for contacting a rod being held by said member in said position, lifting the rod from said recess, and moving the rod directly above said glue pattern after said plate moves from said position;

and means for creating suction at said fluid port to cause adherence of said rod to said applicator member and then subsequently pressurizing said fluid port to deposit said rod on said glue pattern.

6. A rod transfer mechanism comprising:

a magazine having a rod-dispensing opening;

a first member having a rod-receiving recess therein and movable along a first path between one position wherein said recess is below said opening and another position wherein said recess is clear of said opening;

a first fluid port in said first member communicating with said recess;

a second member having a rod-contacting portion and movable along a second path intersecting said first path, said second member having one position wherein said portion is able to contact a rod in said recess when said first member is in said other position, and said second member having another position wherein said portion is below said first path;

a second fluid port in said second member communicating with said rod contacting portion;

means for moving said first and second members along said first and second paths, respectively;

and means for causing said first fluid port to exhibit low pressure so as to retain a rod in said recess while said first member is being moved to said other position and for causing said first fluid port to exhibit at least atmospheric pressure so as to release said rod when said first member is in said one position, and for causing said second fluid port to exhibit low pressure so as to retain a rod thereagainst while said second member is being moved from said one position to said other position and to exhibit at least atmospheric pressure when said second member reaches said other position to thereby release the rod.

7. In a machine for making hanging file folders, each of which folders comprises a blank and at least one support rod, in combination:

conveyor means for moving said blank along a path, said blank having a glue pattern thereon, said means for moving said blank along said path comprising a pair of separable rollers between which said blank passes;

means for momentarily interrupting movement of said blank along said path, said means for interrupting movement of said blank along said path comprising means to effect separation of said rollers and a stop member movable into the path of movement of said blank;

a rod-dispensing magazine adjacent said path, said magazine having a rod-dispensing opening therein;

and a rod transfer mechanism for transferring a rod from said rod-dispensing magazine and for applying said rod to said glue pattern while movement of said blank along said path is interrupted;

said rod transfer mechanism comprising:

a first member having a rod-receiving recess therein and movable along a first path between one position wherein said recess is below said opening and another position wherein said recess is clear of said opening;

a first fluid port in said first member communicating with said recess;

a second member having a rod-contacting portion and movable along a second path intersecting said first path, said second member having one position wherein said portion is able to contact a rod in said recess when said first member is in said other position, and said second member having another position wherein said portion is below said first path;

a second fluid port in said second member communicating with said rod contacting portion;

means for moving said first and second members along said first and second paths, respectively;

and means for causing said first fluid port to exhibit low pressure so as to retain a rod in said recess while said first member is being moved to said other position and for causing said first fluid port to exhibit at least atmospheric pressure so as to release said rod when said first member is in said one position, and for causing said second fluid port to exhibit low pressure so as to retain a rod thereagainst while said second member is being moved from said one position to said other position and to exhibit at least atmospheric pressure when said second member reaches said other position to thereby release the rod.

* * * * *